UNITED STATES PATENT OFFICE.

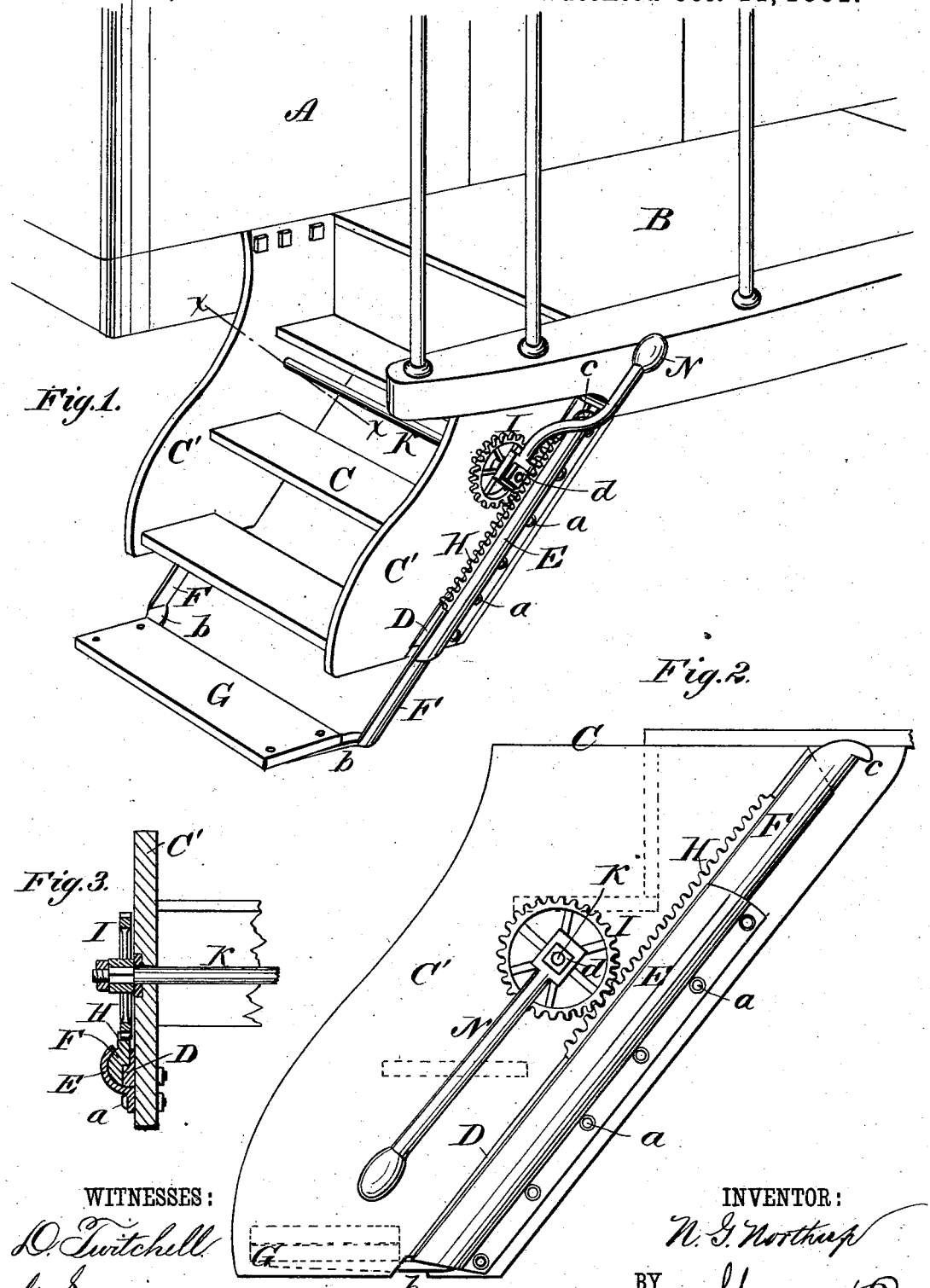

NELSON G. NORTHUP, OF EATON RAPIDS, MICHIGAN.

EXTENSION-STEP FOR CARS.

SPECIFICATION forming part of Letters Patent No. 248,201, dated October 11, 1881.

Application filed August 2, 1881. (Model.)

*To all whom it may concern:*

Be it known that I, NELSON G. NORTHUP, of Eaton Rapids, in the county of Eaton and State of Michigan, have invented a new and useful Improvement in Extension-Steps for Cars and other Vehicles, of which the following is a specification.

The object of this invention is to provide a convenient device whereby the steps of cars and other vehicles may, when desired, be quickly lengthened and shortened.

The invention consists of a step secured to and combined with the ordinary car or vehicle steps, and made vertically adjustable for the purpose of extending the steps downward to any desired point, and thus affording an auxiliary step under the lower fixed step of the car or vehicle.

The invention consists, further, of improved holding and adjusting mechanism for the same, all of which will be hereinafter set forth.

Figure 1 is a perspective view of the improved step in position on a car. Fig. 2 is an enlarged side elevation of a car-step with the improved device attached. Fig. 3 is a cross-section on line $x\ x$, Fig. 1.

Similar letters of reference indicate corresponding parts.

In the drawings, A represents a car, B the platform thereof, and C the car-steps, of ordinary construction.

On the outer faces of the step-sides C', near and parallel with their rear edges, and extending nearly the whole length thereof, are secured flat metallic plates or ways D, and over these plates D are secured, with their concave faces inward, by screws $a$ or other convenient device, semi-tubular ways or guides E, whereby is formed on each side of the steps C guides or sockets for holding and directing the hangers F, that support the auxiliary step G. These hangers F are in this instance made of half-round iron to accommodate themselves to the guides E, and thereby receive a better support therefrom, and on the upper edges of these hangers F are formed or secured racks H, that project out between the guides or plates D E, for the engagement therewith of the pinions I, which are keyed on the opposite ends of a rod or shaft, K, that passes transversely through from one side to the other of the car-steps C. The lower ends of these hangers F are bent inward toward each other, as shown at $b$, and upon them is secured the auxiliary step G, and the upper ends of said hangers F are pointed and turned over, as shown at $c$, thereby forming stops to prevent the said hangers F and step G from being too far extended, and at the same time holding them firmly in position when extended.

Held on one end of the shaft K by a nut, $d$, or other convenient device, is a handle, N, whereby said rod K and pinions I are revolved. The pinions I are preferably of such a diameter that with a half revolution they will, being geared in the racks H, thrust out or withdraw the hangers F and step G to their fullest extent. Hence, on turning the handle N to the upward position shown in Fig. 1 the step G is extended or thrust down about ten inches, or any other designed distance below the lower car-step, C, and on turning said handle N in the opposite direction, as shown in Fig. 2, said step G is withdrawn or closed up snugly against the bottom of the lower step, C.

This device has the advantages of simplicity, strength, and durability over all others with which I am acquainted that are designed for the same purpose.

Having thus described my invention, I claim as new and desire to secure by Letters Patent—

1. The combination, with the steps C and the hangers F of the step G, of the plate D and the semi-tubular guides E, secured to the steps over the said plate, substantially as and for the purpose set forth.

2. The combination, with the car-steps C, of the guides D E, hangers F, racks H, step G, and shaft and pinions K I, substantially as herein shown and described, whereby said steps may be extended or shortened, as set forth.

3. The combination, with steps C, the guides D E, the pinion K of the hangers F, of the auxiliary step G, provided with the rack H, and the stop $c$, substantially as and for the purpose set forth.

NELSON G. NORTHUP.

Witnesses:
MICHAEL KENNEY,
JOHN RYAN.